United States Patent [19]
Carron

[11] Patent Number: 4,680,693
[45] Date of Patent: Jul. 14, 1987

[54] CONTINUOUS HIGH D.C. VOLTAGE SUPPLY PARTICULARLY FOR AN X-RAY EMITTER TUBE

[75] Inventor: Claude Carron, Montmagny, France

[73] Assignee: Thomson-CGR, Paris, France

[21] Appl. No.: 827,725

[22] Filed: Feb. 10, 1986

[30] Foreign Application Priority Data

Feb. 12, 1985 [FR] France ............... 85 01971

[51] Int. Cl.[4] ........................... H02P 13/20
[52] U.S. Cl. ........................ 363/98; 363/132
[58] Field of Search ............ 363/17, 98, 132; 378/101, 104, 105, 111, 112

[56] References Cited

U.S. PATENT DOCUMENTS

| | | | |
|---|---|---|---|
| 3,539,812 | 11/1970 | Johnson | 250/103 |
| 4,200,795 | 4/1986 | Kawamura et al. | 250/402 |
| 4,227,243 | 10/1980 | Gurwicz et al. | 363/98 X |
| 4,301,498 | 11/1981 | Farrer | 363/17 |
| 4,504,895 | 3/1985 | Steigerwald | 363/132 X |
| 4,525,774 | 6/1985 | Kino et al. | 363/17 |

FOREIGN PATENT DOCUMENTS

| | | |
|---|---|---|
| 0108336 | 5/1984 | European Pat. Off. |
| 2184732 | 5/1973 | France |
| 2415415 | 1/1979 | France |
| 2455844 | 4/1980 | France |

*Primary Examiner*—Peter S. Wong
*Attorney, Agent, or Firm*—Oblon, Fisher, Spivak, McClelland, Maier

[57] ABSTRACT

A d.c. voltage is produced from a single-phase electric mains for supplying an X-ray tube. This supply is pulsed under the control of a synchronizing circuit with which it is further possible to adjust the duration of the operating pulses, as well as their phase blocking with respect to the mains. By acting in this way excessive current is not taken during the voltage troughs between two successive half-waves. The losses by the Joule effect in the mains are reduced and the quality of the pulsed high voltage is improved because of the increased stability. There is only a slight increase in the exposure time.

5 Claims, 12 Drawing Figures

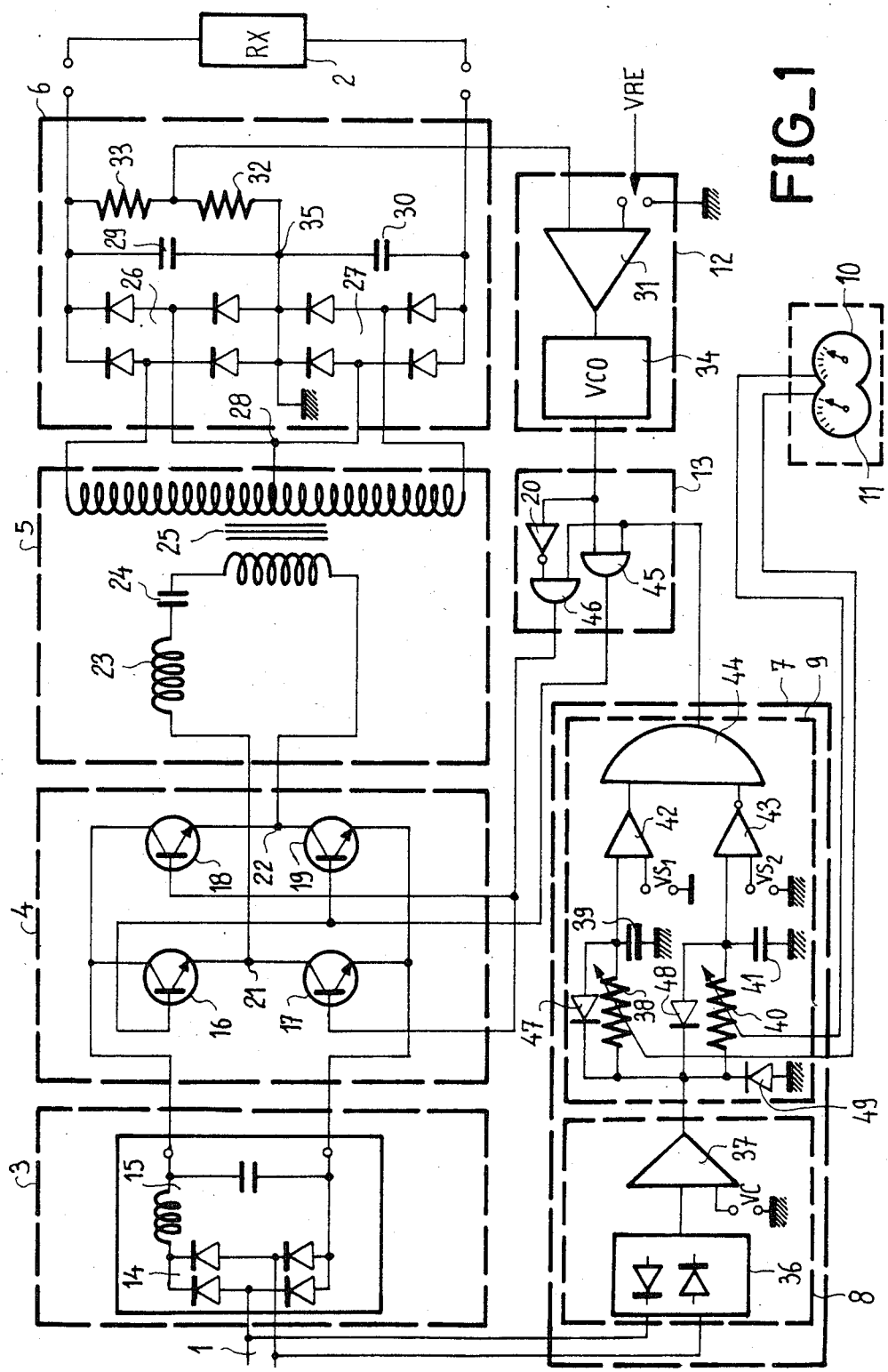
FIG_1

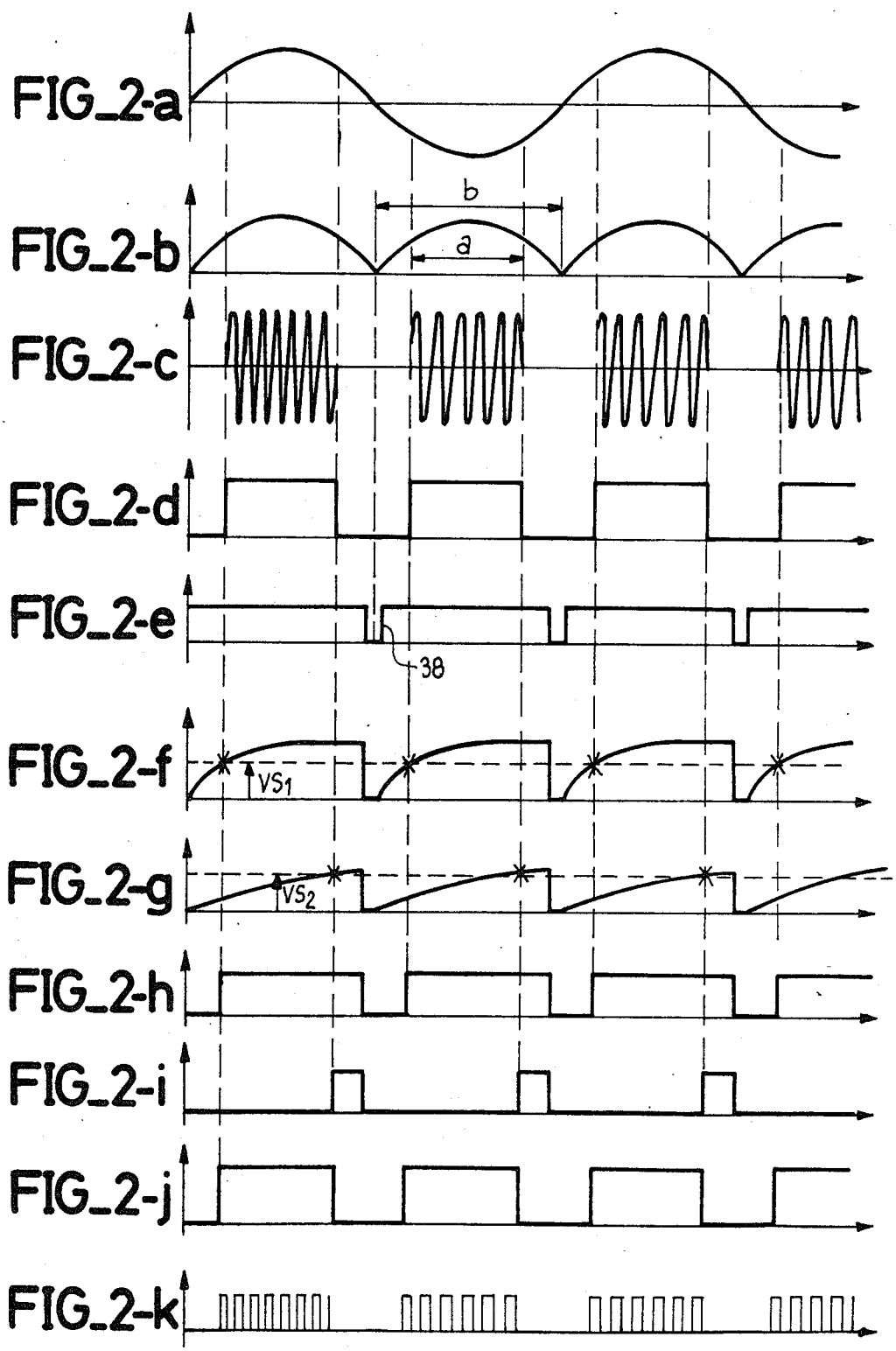

CONTINUOUS HIGH D.C. VOLTAGE SUPPLY PARTICULARLY FOR AN X-RAY EMITTER TUBE

BACKGROUND OF THE INVENTION

1. Field of the Invention

The present invention relates to a d.c. high voltage supply, particularly for an X-ray emitter tube. However, it can also apply to other fields. The supplies in question are intended to be connected to a general electric mains.

2. Description of the Prior Art

Most of the supplies have high frequency generators at present. The mains undergoes rectification and filtration, the d.c. voltage obtained is rippled at high frequency by a ripple generator, the ripple voltage is raised by a step-up transformer, followed by rectification and filtration. This type of supply functions perfectly when the mains is of the three-phase type, but certain problems arise with the single-phase type. Thus, there is a voltage trough between two half-waves. Thus, in this trough, the ripple generator cannot take power from the mains. The use of a LC filter for storing energy at the peak of the sinusoid, so as to restore it during said trough cannot be used for power levels of approximately 30 to 100 kW. The filters become enormous as regards size and cost. Another standard solution consists of directly raising the single-phase mains voltage and then rectifying it after raising. However, the rectified high voltage follows the system and drops completely in the voltage troughs between half-waves. The spectrum of the X-rays emitted then extends over a vast range. This solution is increasingly falling into disfavour and is in fact forbidden in certain countries.

SUMMARY OF THE INVENTION

The present invention aims at obviating the aforementioned disadvantages by proposing a power supply in which the high voltage is chopped. It is only produced during short times corresponding to the peaks of the half-waves of the single-phase network. In this way energy is not taken from the network or mains when this is at low voltage and during these stoppages the current is zero. There is then no loss as a result of an excessive Joule effect in the network.

The invention relates to a d.c. high voltage power supply of the type receiving alternating electrical energy from a general single-phase distribution mains, wherein it comprises means for periodically tapping energy from the mains during periods shorter than one half-wave and for thus producing a periodically chopped high d.c. voltage.

BRIEF DESCRIPTION OF THE DRAWINGS

The invention is described in greater detail hereinafter relative to non-limitative embodiments and the attached drawings, wherein show:

FIG. 1. A power supply according to the invention.

FIGS. 2a to 2k. Time charts or diagrams of signals involved in the supply according to the invention.

DESCRIPTION OF THE PREFERRED EMBODIMENTS OF THE INVENTION

FIG. 1 shows a high voltage supply according to the invention. It receives electrical energy from a single-phase mains 1 and converts it into a high d.c. voltage for supplying an X-ray tube 2. It has first means 3 for double half-wave rectification and filtering of the single-phase voltage. A ripple generator 4 supplied by rectifier 3 feeds into voltage raising means 5. In an embodiment, the ripple generator oscillates at a few dozen kilohertz. Second rectifying means 6 rectify and filter the alternating high voltage supplied by transformer 5 and deliver a high d.c. voltage to tube 2. An important feature of the invention is that chain 3–6 operates so as to periodically tap energy from the mains 1 under the control of synchronization means 7, which are provided with means 8 for recognising the phase of the mains. Said means are also provided with means 9 for varying the synchronization blocking with respect to the phase of the mains or for varying the tapping periods. Means 9 are related with controls 10, 11 on which an operator can act.

In the represented embodiment, the supply also has regulating means 12, which regulate the high voltage produced by the second rectifier 6 as a function of an externally applied reference VRE. In a preferred embodiment, the synchronization means 7 act on means 13 for validating the operation of the regulating means 12. In other words, when permitted by the synchronization means, the regulated high voltage is normally supplied. When they no longer permit it and in particular during the voltage troughs of the single-phase signal of the mains, the regulation chain is interrupted and the high voltage from it is cancelled out.

The first rectification means 3 are conventionally provided with double half-wave rectifying means 14 in cascade with a low-pass filter 15. The ripple generator 4 is conventionally provided with four power transistors mounted in cascade in pairs 16–17 and 18–19 between the two outputs of rectifier 3. The diagonally opposite bases of the transistor 16–19 and 17–18 are connected together. They receive complementary conduction instructions via an inverter 20 from the validation means 13. The two cascades of transistors then operate in inverted push-pull-like manner. Their centre points, respectively 21 and 22 are connected to the voltage raising means 5, which in this case incorporate an oscillating circuit with an inductance coil 23 and a capacitor 24, tuned to a frequency slightly below the minimum frequency at which ripple generator 4 is expected to oscillate. According to an example, the frequency of said filter is 18 kHz. Inductance coil 23 represents the actual inductance, as well as the stray inductance of a transformer 25 in series, which is used for raising the voltage.

Transformer 25 feeds into second rectifying means 6 incorporating two double half-wave rectifying circuits 26, 27. Each of these is connected between a centre point 28 of transformer 25 and to one of the ends of the secondary winding of said transformer. Smoothing means, e.g. incorporating two capacitors 29, 30 make it possible to filter the double half-wave rectification of circuits 26, 27 respectively. The high voltage then appears substantially flat. Capacitors 29 and 30 are small, because the rectified high alternating voltage is a high frequency voltage. The centre point 35 of rectifiers 26–27 is connected to earth. It makes it possible to divide by two, compared therewith, the value of the high voltage produced. The insulation stresses of the high voltage connections are then also divided by two.

The interest of oscillating circuit 23–24 is based on the sinusoidal appearance of the voltage produced by it. This sinusoidal voltage on the one hand more easily passes through transformer 25 than a square-wave signal of the same frequency. Moreover, during the rectification in rectifiers 26, 27, the regular decrease of the current, as well as its regular increase at each half-wave is favourable for a good store removal of the electronic charges stored at the time of saturation in the diodes of said rectifiers. This sinusoidal appearance is also favourable with regards to reducing the reinjection of radio interference into mains 1.

It will be shown hereinafter that the regulation of the supply takes place by frequency modulation. The regulating means 12 are in fact provided with a frequency modulator 34 (VCO). At maximum high voltage, the oscillating circuit is slightly detuned by excess and the ripple generator e.g. oscillates at 20 kHz, whereas the oscillating circuit 23-24 is tuned to 18 kHz. At minimum high voltage, the oscillating frequency of the ripple generator is higher (e.g. 50 kHz), the oscillating circuit is strongly detuned and only permits the passage of less power. This frequency distribution is provided in order to minimize switching losses. Thus, at maximum high voltage, the oscillating frequency is at a minimum and consequently the losses by switching are at a minimum. At minimum high voltage, the oscillating frequency is at a maximum, so that the switching losses are at a maximum. However, this is not prejudicial, because in this case the power required by the supply is low.

The regulating loop incorporates a comparator 31 receiving on a first input a signal from a divider bridge 32-33 (which measures the high voltage produced) and which receives on a second input a reference voltage VRE representing the high voltage at which tube 2 is to operate. The error signal produced by comparator 31 is introduced into a frequency modulator 34, which e.g. produces a square-wave signal at a frequency definitively dependant on the reference voltage VRE. The square-wave signal is applied at the same time as its complementary to the corresponding bases of the transistors of ripple generator 4.

The synchronization means incorporate means 8 for recognising the phase of the mains signal. Means 8 incorporate a double half-wave rectifier 36, which feeds into a comparator 37. The signal produced at the output of means 8 appears in FIG. 2e. The comparision voltage VC with which is compared the double half-wave rectified signal is sufficiently low for the output signal of comparator 37 to have a rising front 38 relatively close in time to the zero passage time between two successive half-waves. This phase finding or designation signal is introduced into means 9 for varying the blocking. These comprise two RC circuits, respectively 38-39 and 40-41. The centre points of these RC circuits are connected to first inputs of comparators respectively 42 and 43. Each comparator receives at its second input a threshold voltage, respectively VS1 and VS2. These two voltages can be equal, but this is not a necessary requirement. The rising front 38 of the signal emanating from comparator 37 is not transmitted immediately to capacitors 39 or 41. The latter are only charged at the end of a time which is dependant on the time constant of their RC circuits. Charts 2f and 2g show how the potentials evolve at the terminals of the capacitors. In an example, the time constant of circuit 38-39 is less than the time constant of circuit 40-41. In this example, thresholds VS1 and VS2 are equal, so that comparator 42 switches over before comparator 43, as shown in charts 2h and 2i. By connecting the outputs of said comparators to the inputs of a logic AND gate 44 (having previously reversed the output of comparator 43), at the output of said gate 44 there is an active logic square-wave pulse between the times when comparators 42 and 43 have switched over, as shown in chart 2j.

Each of the RC circuits of means 9 is surmounted by a diode 47 or 48 for completely discharging capacitors 39 or 41 at each half-wave change. A diode 49 connected in parallel at the output of comparator 37 aids this discharge. Another feature of RC circuits is that their time constant is regulatable. For example, resistors 38 and 40 can be regulated by graduated switch handles 10, 11. By acting on the latter, it is possible to determine the time of putting into operation, as well as the stoppage time of ripple generator 4, so that the duration can be modified. Validation circuit 13 incorporates two logic AND gates respectively 45 and 46 receiving on a first of their inputs the signal from AND gate 44. On their second input, they receive the square-wave signal or its complementary from modulator 34. Thus, these logic gates supply pulse signals comparable to that of chart 2k. The ripple generator operates during the active periods of duration a in a half-wave duration b. The X-ray tube is supplied with power. Outside durations a, the bases of the transistors of the switching generator are brought to zero, all the transistors are blocked and the X-ray tube is no longer supplied.

Charts 2a to 2d respectively represent the mains signal, the double half-wave rectified signal, the sinusoidal signal at the output of the ripple generator and the filtered rectified high voltage signal applicable to the terminals of the X-ray tube. The oscillating frequency of the rippled signal is the same as the frequency of the signal supplied by logic gates 45 and 46.

In a preferred manner with respect to a half-wave corresponding to a 180° phase rotation, the duration a of putting ripple generator 4 into operation is in between the times when said phase is 40° and 140°. It might be thought that this manner of operating would increase the exposure time necessary for producing a radiographic negative. However, this is not the case. For the operating time a referred to, if the peak value of the chopped d.c. voltage is approximately 90% of the peak value of a rectified half-wave voltage, the exposure times are substantially identical. Moreover, the images or pictures obtained in the invention are better, because there is little development in the supply voltage throughout the exposure. With a double half-wave rectified voltage (100 Hz), the spectrum emitted takes the whole range as a result of the voltage trough.

By comparison with a conventional supply, in which the d.c. voltage is not chopped, the exposure times are increased in the ratio b/a. However, these conventional solutions are only of a theoretical nature in single-phase, due to the fact that they require excessive capacitors and inductance coils. It has been found that the filtering elements 29 and 30 can be reduced in a ratio of 4, whilst the exposure time is not even doubled. It is also possible to carry out settings in such a way that at a low high voltage the cyclic ratio a/b is higher, action then taking place on switch handles 10 and 11. Comparative measurements have been carried out. They revealed that the peak current absorbed from mains 1 was lower in the invention than that measured with a permanent d.c. high voltage generator. This is essentially due to the fact that tube 2 taps no current when the voltage on the mains is low, i.e. during the voltage troughs. The consumption efficiency is higher in the case of the invention. In particular, electrical energy taken in the form of a current is partly dissipated by the actual mains, because the latter is not perfectly conductive. From this standpoint, the higher the internal resistance of the mains, the more the comparison is favourable towards the invention.

What is claimed is:

1. A high voltage d.c. supply which receives alternating electrical energy from a general single-phase distribution mains, comprising:

means for periodically tapping said energy from said mains during periods having a duration less than a half-wave of the alternating electrical energy to thereby produce periodically chopped high d.c. voltage synchronized with said alternating electrical energy;

means for regulating said chopped high voltage wherein said regulating means includes a frequency modulator for modulating an oscillating frequency of a ripple generator and wherein said means for periodically tapping said energy includes a means for validating that said regulating means is operating.

2. A supply according to claim 1, comprising:

first rectifying means connected to said mains, wherein said ripple generator is connected to the first rectifying means, and wherein said ripple generator produces a rippled voltage;

means for raising the voltage produced by said ripple generator and a second rectifying and filtering means connected to said raising means, wherein said periodic tapping means includes means for synchronizing said ripple generator with said mains.

3. A supply according to claim 2, wherein said first and second rectifying means are a double half-wave rectifier.

4. A supply according to one of claims 2 or 3, wherein the synchronizing means includes means for varying said means for synchronizing depending upon the phase of said mains.

5. A supply according to any one of the claims 2 or 3, wherein said synchronization means includes means for increasing or decreasing the times during which said tapping is performed.

* * * * *